US012559221B2

(12) United States Patent
Files et al.

(10) Patent No.: US 12,559,221 B2
(45) Date of Patent: Feb. 24, 2026

(54) SUPPORT BOX APPARATUS

(71) Applicant: The Boeing Company, Chicago, IL (US)

(72) Inventors: Joe Files, Seattle, WA (US); Adam A. Logue, Seattle, WA (US); Robert B. Fowler, Seattle, WA (US); Steven E. Rhynard, Seattle, WA (US); Jeffrey A. Cartwright, Arlington, WA (US)

(73) Assignee: The Boeing Company, Arlington, VA (US)

( * ) Notice: Subject to any disclaimer, the term of this patent is extended or adjusted under 35 U.S.C. 154(b) by 377 days.

(21) Appl. No.: 17/929,088

(22) Filed: Sep. 1, 2022

(65) Prior Publication Data

US 2024/0076027 A1 Mar. 7, 2024

(51) Int. Cl.
| | |
|---|---|
| *B64C 1/06* | (2006.01) |
| *B60Q 3/43* | (2017.01) |
| *B64D 13/06* | (2006.01) |

(52) U.S. Cl.
CPC ............... *B64C 1/068* (2013.01); *B60Q 3/43* (2017.02); *B64C 1/061* (2013.01); *B64D 13/06* (2013.01); *B64D 2013/0603* (2013.01)

(58) Field of Classification Search
CPC ......... B64C 1/061; B64C 1/064; B64C 1/065; B64C 1/066; B64C 1/068; B64C 1/069; B64C 1/22; B64D 13/06; B64D 2013/0603
See application file for complete search history.

(56) References Cited

U.S. PATENT DOCUMENTS

| | | | |
|---|---|---|---|
| 2003/0209632 A1* | 11/2003 | Hessling | B64C 1/066 |
| | | | 244/119 |
| 2012/0074258 A1* | 3/2012 | Papke | B64D 11/003 |
| | | | 244/118.5 |
| 2017/0057612 A1* | 3/2017 | King | B64C 1/061 |
| 2017/0058561 A1* | 3/2017 | Terry | E05C 3/16 |
| 2017/0129751 A1* | 5/2017 | Cisnero | B64D 9/00 |
| 2020/0362595 A1* | 11/2020 | Files | E05F 3/20 |
| 2023/0159170 A1* | 5/2023 | Esau | B64C 1/066 |
| | | | 244/118.5 |

* cited by examiner

*Primary Examiner* — Joshua J Michener
*Assistant Examiner* — Colin Zohoori
(74) *Attorney, Agent, or Firm* — Joseph M. Butscher; Carroll, Hoette & Butscher, LLC

(57) ABSTRACT

A support box apparatus includes longitudinal members that span forward to aft and transverse members that span inboard to outboard between the longitudinal members. The longitudinal members and the transverse members are formed of composite honeycomb sandwich panels. The support box apparatus also includes attachment components configured to couple the longitudinal members or the transverse members to structural components of an aircraft, electrical wiring attached to the longitudinal members or the transverse members, environmental control system (ECS) ducting attached to the longitudinal members or the transverse members, and life support lines attached to the longitudinal members or the transverse members.

20 Claims, 11 Drawing Sheets

Figure 10:
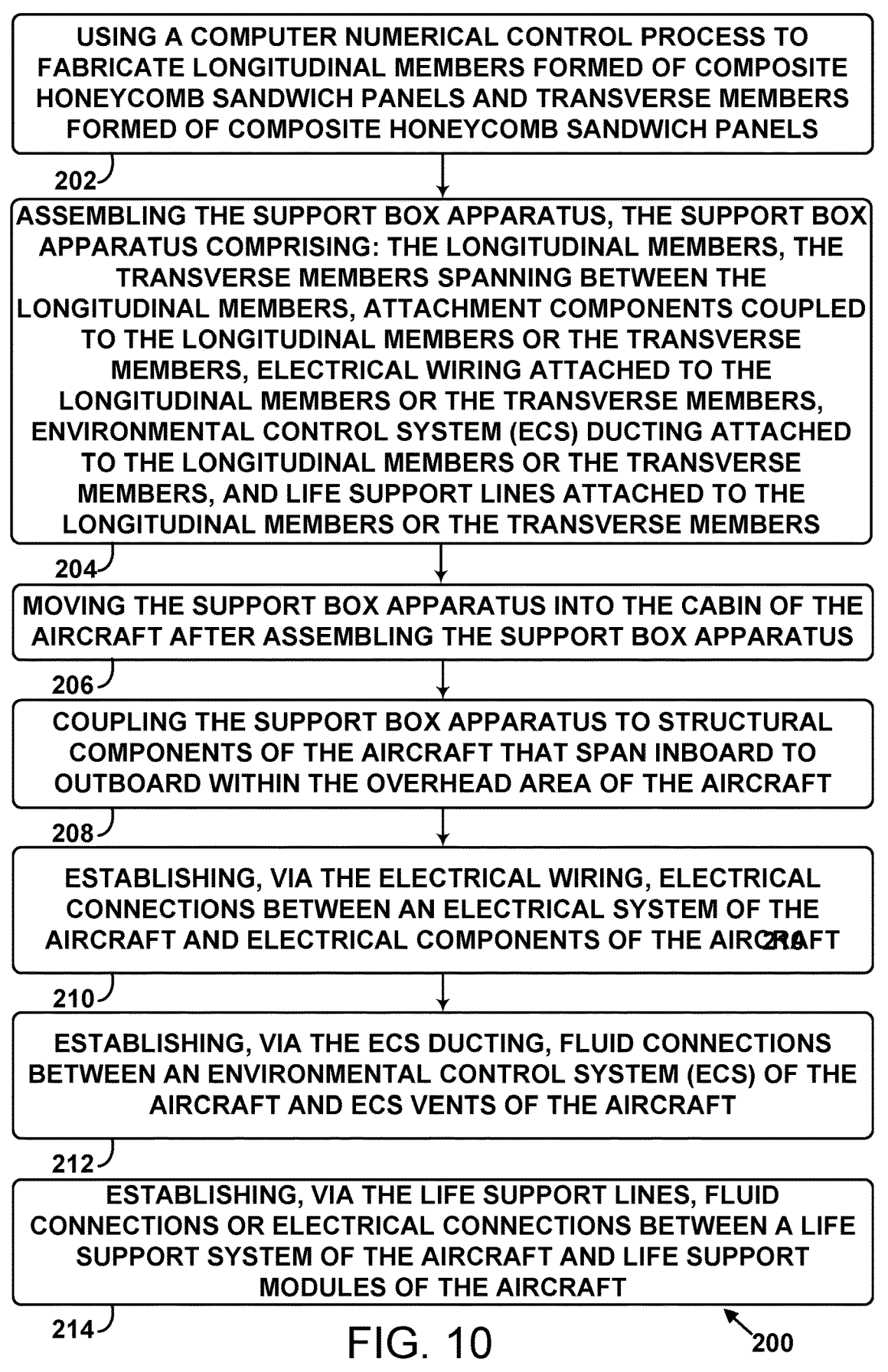

USING A COMPUTER NUMERICAL CONTROL PROCESS TO FABRICATE LONGITUDINAL MEMBERS FORMED OF COMPOSITE HONEYCOMB SANDWICH PANELS AND TRANSVERSE MEMBERS FORMED OF COMPOSITE HONEYCOMB SANDWICH PANELS

202

↓

ASSEMBLING THE SUPPORT BOX APPARATUS, THE SUPPORT BOX APPARATUS COMPRISING: THE LONGITUDINAL MEMBERS, THE TRANSVERSE MEMBERS SPANNING BETWEEN THE LONGITUDINAL MEMBERS, ATTACHMENT COMPONENTS COUPLED TO THE LONGITUDINAL MEMBERS OR THE TRANSVERSE MEMBERS, ELECTRICAL WIRING ATTACHED TO THE LONGITUDINAL MEMBERS OR THE TRANSVERSE MEMBERS, ENVIRONMENTAL CONTROL SYSTEM (ECS) DUCTING ATTACHED TO THE LONGITUDINAL MEMBERS OR THE TRANSVERSE MEMBERS, AND LIFE SUPPORT LINES ATTACHED TO THE LONGITUDINAL MEMBERS OR THE TRANSVERSE MEMBERS

204

↓

MOVING THE SUPPORT BOX APPARATUS INTO THE CABIN OF THE AIRCRAFT AFTER ASSEMBLING THE SUPPORT BOX APPARATUS

206

↓

COUPLING THE SUPPORT BOX APPARATUS TO STRUCTURAL COMPONENTS OF THE AIRCRAFT THAT SPAN INBOARD TO OUTBOARD WITHIN THE OVERHEAD AREA OF THE AIRCRAFT

208

↓

ESTABLISHING, VIA THE ELECTRICAL WIRING, ELECTRICAL CONNECTIONS BETWEEN AN ELECTRICAL SYSTEM OF THE AIRCRAFT AND ELECTRICAL COMPONENTS OF THE AIRCRAFT

210

↓

ESTABLISHING, VIA THE ECS DUCTING, FLUID CONNECTIONS BETWEEN AN ENVIRONMENTAL CONTROL SYSTEM (ECS) OF THE AIRCRAFT AND ECS VENTS OF THE AIRCRAFT

212

↓

ESTABLISHING, VIA THE LIFE SUPPORT LINES, FLUID CONNECTIONS OR ELECTRICAL CONNECTIONS BETWEEN A LIFE SUPPORT SYSTEM OF THE AIRCRAFT AND LIFE SUPPORT MODULES OF THE AIRCRAFT

Figure 11:
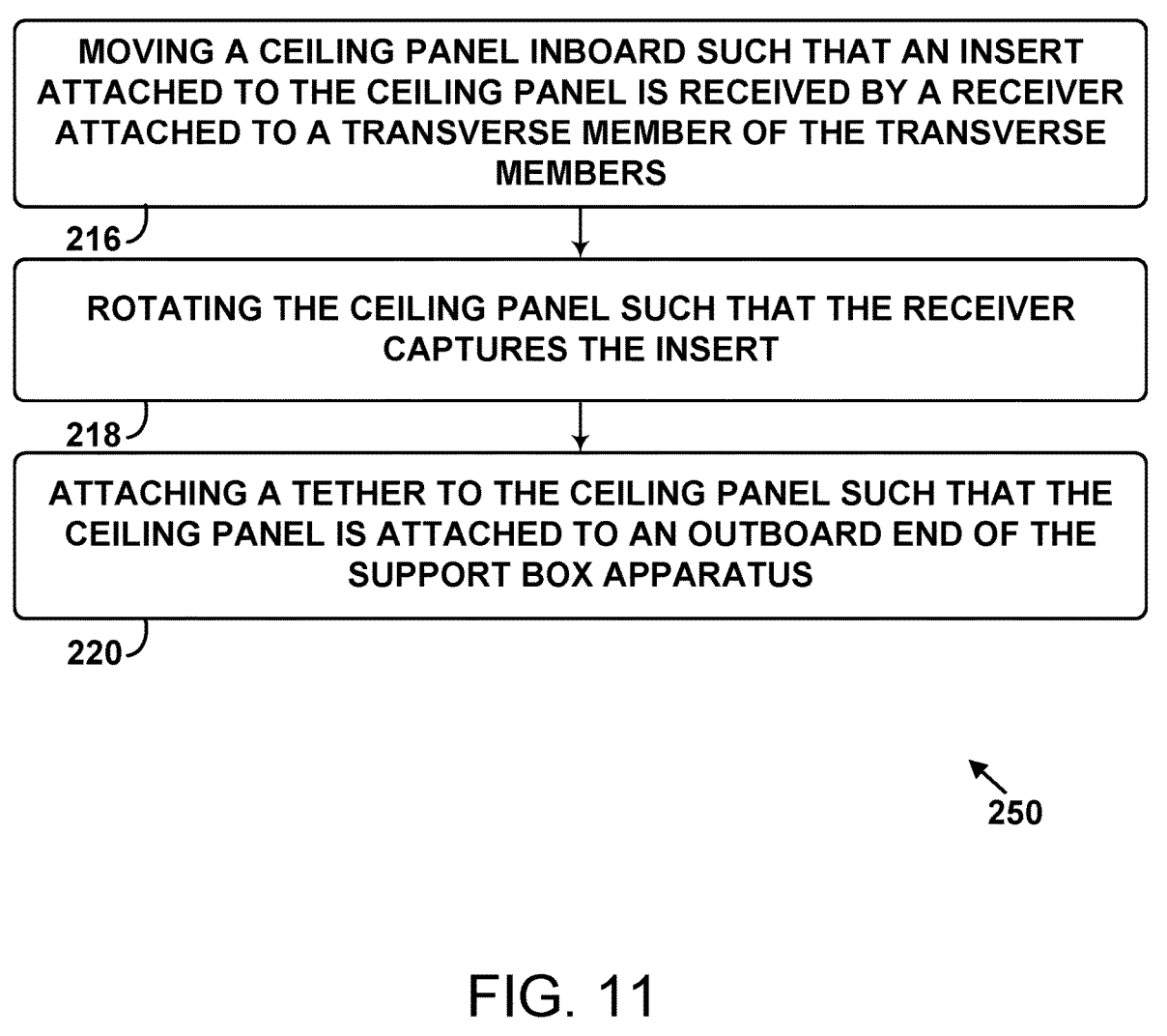

MOVING A CEILING PANEL INBOARD SUCH THAT AN INSERT ATTACHED TO THE CEILING PANEL IS RECEIVED BY A RECEIVER ATTACHED TO A TRANSVERSE MEMBER OF THE TRANSVERSE MEMBERS

216

ROTATING THE CEILING PANEL SUCH THAT THE RECEIVER CAPTURES THE INSERT

218

ATTACHING A TETHER TO THE CEILING PANEL SUCH THAT THE CEILING PANEL IS ATTACHED TO AN OUTBOARD END OF THE SUPPORT BOX APPARATUS

SUPPORT BOX APPARATUS

FIELD

The present disclosure generally relates to a support box apparatus, and more specifically to a support box apparatus that includes members made of composite honeycomb sandwich panels.

BACKGROUND

Customized first class and business class aircraft interiors can be an opportunity for commercial airlines to distinguish their services from competitors. Such aircraft interiors can include high ceilings with decorative ceiling panels, custom signage, or similar features that have both functional and aesthetic qualities. Typical structures used to support decorative overhead interiors tend to be a mix of metal or plastic elements assembled in a standardized manner to accommodate a specific closeout feature (e.g., an aisle ceiling, an over-monument fairing, a cross-aisle ceiling, etc.). Usually these structures vary only in length because the length is most likely to change due to seat pitch, monument selection, and other configuration differences. These structures can be adequate for repetitious, simple, or ordinary aircraft interior designs, but typically are not suitable for unique, highly customized, and/or highly complex integration requirements. As such, a need exists for systems and methods that can be used to better facilitate the installation of unique aircraft interior designs.

SUMMARY

One aspect of the disclosure is a support box apparatus for an overhead area of a cabin of an aircraft, the support box apparatus comprising: a framework comprising: longitudinal members that span forward to aft, wherein the longitudinal members are formed of composite honeycomb sandwich panels; transverse members that span inboard to outboard between the longitudinal members, wherein the transverse members are formed of composite honeycomb sandwich panels; and attachment components configured to couple the longitudinal members or the transverse members to structural components of the aircraft that span inboard to outboard above the longitudinal members and the transverse members; electrical wiring attached to the longitudinal members or the transverse members, wherein the electrical wiring is configured to provide electrical connections between an electrical system of the aircraft and electrical components of the aircraft; environmental control system (ECS) ducting attached to the longitudinal members or the transverse members, wherein the ECS ducting is configured to provide fluid connections between an environmental control system (ECS) of the aircraft and ECS vents of the aircraft; and life support lines attached to the longitudinal members or the transverse members, wherein the life support lines are configured to provide fluid connections or electrical connections between a life support system of the aircraft and life support modules of the aircraft.

Another aspect of the disclosure is an aircraft comprising: structural components that span inboard to outboard; a framework comprising: longitudinal members below the structural components that span forward to aft, wherein the longitudinal members are formed of composite honeycomb sandwich panels; transverse members below the structural components that span inboard to outboard between the longitudinal members, wherein the transverse members are formed of composite honeycomb sandwich panels; and attachment components that couple the longitudinal members or the transverse members to the structural components; electrical wiring attached to the longitudinal members or the transverse members, wherein the electrical wiring provides electrical connections between an electrical system of the aircraft and electrical components of the aircraft; environmental control system (ECS) ducting attached to the longitudinal members or the transverse members, wherein the ECS ducting provides fluid connections between an environmental control system (ECS) of the aircraft and ECS vents of the aircraft; and life support lines attached to the longitudinal members or the transverse members, wherein the life support lines provide fluid connections or electrical connections between a life support system of the aircraft and life support modules of the aircraft.

Another aspect of the disclosure is a method for installing a support box apparatus in an overhead area of a cabin of an aircraft, the method comprising: using a computer numerical control process to fabricate longitudinal members formed of composite honeycomb sandwich panels and transverse members formed of composite honeycomb sandwich panels; assembling the support box apparatus, the support box apparatus comprising: the longitudinal members; the transverse members spanning between the longitudinal members; attachment components coupled to the longitudinal members or the transverse members; electrical wiring attached to the longitudinal members or the transverse members; environmental control system (ECS) ducting attached to the longitudinal members or the transverse members; and life support lines attached to the longitudinal members or the transverse members moving the support box apparatus into the cabin of the aircraft after assembling the support box apparatus; coupling the support box apparatus to structural components of the aircraft that span inboard to outboard within the overhead area of the aircraft; establishing, via the electrical wiring, electrical connections between an electrical system of the aircraft and electrical components of the aircraft; establishing, via the ECS ducting, fluid connections between an environmental control system (ECS) of the aircraft and ECS vents of the aircraft; and establishing, via the life support lines, fluid connections or electrical connections between a life support system of the aircraft and life support modules of the aircraft.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 10 is a block diagram of a method, according to an example.

FIG. 11 is a block diagram of a method, according to an example.

DETAILED DESCRIPTION

Figure 1:
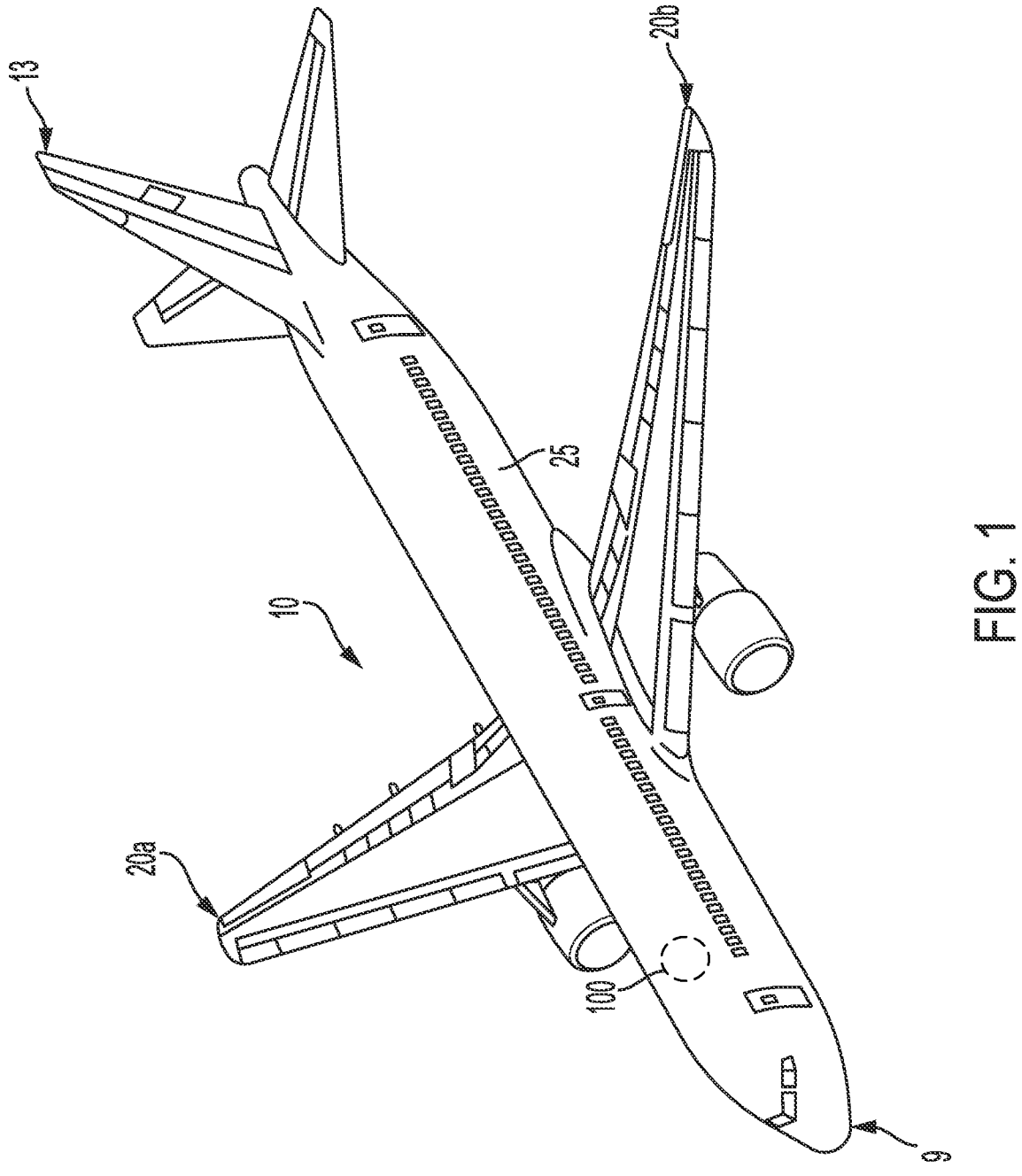
FIG. 1 is a perspective view of an aircraft, according to an example.

As noted above, a need exists for systems and methods that can be used to better facilitate the installation of unique and customized aircraft interior designs. As such, a support box apparatus for an overhead area of a cabin of an aircraft includes a framework. The framework includes longitudinal members that span forward to aft and transverse members that span inboard to outboard between the longitudinal members. The longitudinal members and the transverse members are formed of composite honeycomb sandwich panels. The framework also includes attachment components configured to couple the longitudinal members or the transverse members to structural components of the aircraft that span inboard to outboard above the longitudinal members and the transverse members. The support box apparatus also includes electrical wiring attached to the longitudinal members or the transverse members. The electrical wiring is configured to provide electrical connections between an electrical system of the aircraft and electrical components of the aircraft. The support box apparatus also includes environmental control system (ECS) ducting attached to the longitudinal members or the transverse members. The ECS ducting is configured to provide fluid connections between an environmental control system (ECS) of the aircraft and ECS vents of the aircraft. The support box apparatus also includes life support lines attached to the longitudinal members or the transverse members. The life support lines are configured to provide fluid connections or electrical connections between a life support system of the aircraft and life support modules of the aircraft. As such, the support box apparatus can serve as an "adapter" between standardized structural, electrical, and air flow components of the aircraft and customized features of the interior of the aircraft.

The longitudinal members and the transverse members are typically fabricated using a computer numerical control (CNC) machining process that is highly adaptable to new configurations and dimensions. The longitudinal members and the transverse members are formed of composite honeycomb sandwich panels and, thus, they are lightweight yet strong, are available in standard material stock configurations, and they can allow for quick assembly times and reduced costs, which makes various customized designs more feasible.

The electrical wiring, the ECS ducting, and the life support lines are generally attached to the framework prior to bringing the support box apparatus into the aircraft cabin for installation. Thus, the support box apparatus can be lifted into position and mounted (e.g., via quick-release pins) then the electrical, ECS, and life support systems can be connected to the aircraft runs at centralized connection points. Attaching the electrical wiring, the ECS ducting, and the life support lines to the support box apparatus off board the aircraft is generally more ergonomic and efficient, and also frees up time and space for other activities related to building the custom interior to be performed.

Additionally, the centralized connection points for the electrical system, the ECS, and life support system are pre-installed in the aircraft and ready for connection to the electrical wiring, the ECS ducting, and the life support lines when the support box apparatus is brought on board the aircraft for installation, which makes installation more ergonomic and efficient. The centralized connection points are typically configured for connection to support box apparatuses of varying shapes and sizes.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

FIG. 1 is a perspective view of an aircraft 10 that includes a nose 9, a wing 20a, a wing 20b, a fuselage 25, a tail 13, and a support box apparatus 100. The aircraft 10 includes many areas arranged for storage of items during flight. In one example, the fuselage 25 includes storage underneath a passenger compartment for storing luggage and other items or supplies. The aircraft 10 is shown as a commercial airliner, but other examples are possible. In FIG. 1, the support box apparatus 100 is located near a forward end of the aircraft 10, however this is not required. In some examples, the aircraft 10 includes several support box apparatuses 100.

Figure 2:
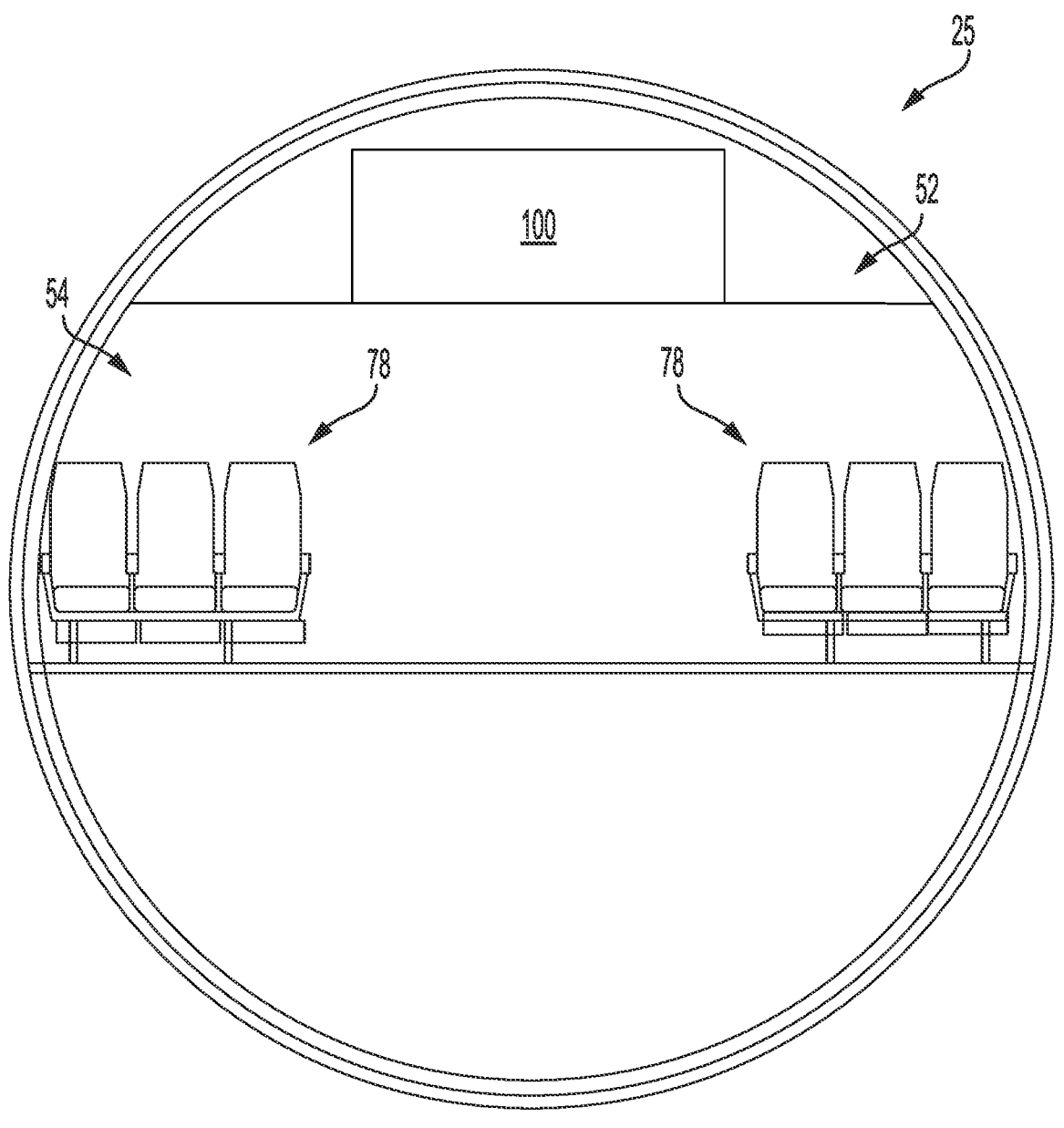
FIG. 2 is an aft-facing cross-sectional view of a fuselage, according to an example.

FIG. 2 is an aft-facing cross-sectional view of the fuselage 25. The fuselage 25 has a cabin 54 including seating 78 for passengers. The layout of the seating 78 in FIG. 2 is provided merely as an example and many other layouts could be used. As shown, the support box apparatus 100 is installed above a ceiling in an overhead area 52 of the cabin 54.

Figure 3:
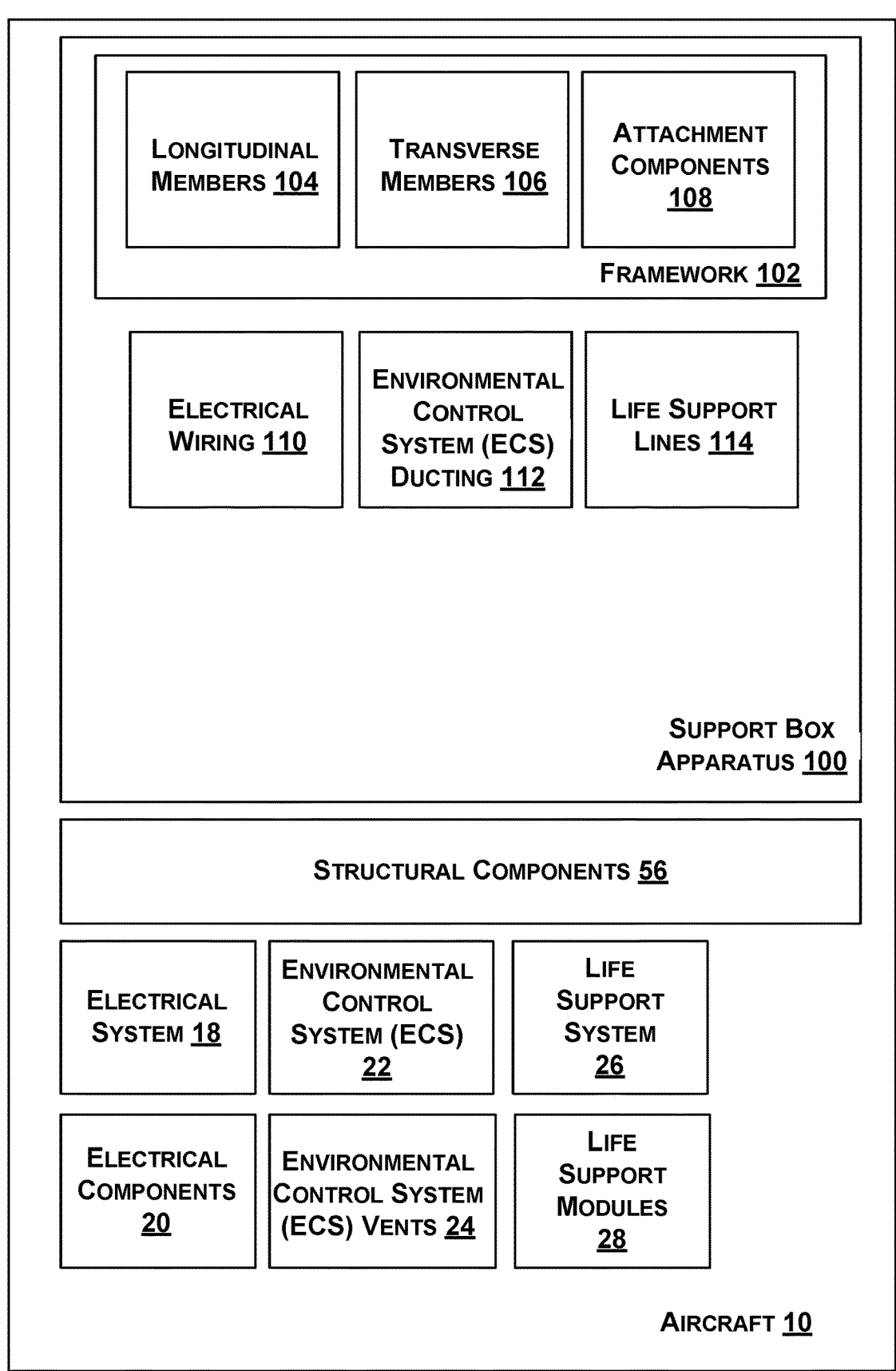
FIG. 3 is a block diagram of an aircraft, according to an example.

FIG. 3 is a block diagram of the aircraft 10. The aircraft 10 includes structural components 56 and a support box apparatus 100 that includes a framework 102. The framework 102 includes longitudinal members 104, transverse members 106, and attachment components 108. The support box apparatus 100 also includes electrical wiring 110, environmental control system (ECS) ducting 112, and life support lines 114.

Although not explicitly shown in FIG. 3, the support box apparatus 100 can include multiple frameworks 102, for example, a framework 102A, a framework 102B, a framework 102C, and a framework 102D, with each framework including at least the components of the framework 102 shown in FIG. 3.

The aircraft 10 further includes an electrical system 18, electrical components 20, an environmental control system (ECS) 22, environmental control system (ECS) vents 24, a life support system 26, and life support modules 28.

The electrical wiring 110 can include electrically conductive wire having an electrically insulating sheath, terminating at ends with various forms of connectors or adapters.

The ECS ducting 112 can include plastic or metal tubing configured for transporting pressurized air from one location to another. The ECS ducting 112 can be stiff or flexible in various examples.

The life support lines 114 can include plastic tubing configured for transporting oxygen, nitrogen, or other pressurized mixtures of gas from one location to another, for example, from the life support system 26 to the life support modules 28. Additionally or alternatively, the life support lines 114 can include electrical wiring that provides electrical connections between the life support system 26 and the life support modules 28.

The electrical system 18 can include computing devices, generators, inverters, batteries, power systems, circuit boards, and/or any circuitry, hardware, or software used for providing power and/or control signals for public address speakers, cabin signage, the ECS 22, the life support system 26, and/or any other system of the aircraft 10 that uses electrical power and/or electrical input signals. As such, the electrical components 20 can include electrically powered signs, public address speakers, overhead cabin lighting, reading lights, and the like.

The ECS 22 can include heating, ventilation, and air-conditioning (HVAC) components such as heaters, fans, air compressors, and thermostats, and can be controlled via the electrical system 18. The ECS vents 24 are configured to be installed at the passenger end of the ECS ducting 112 (e.g., near passenger seating), for example, to provide heated or cooled air for a passenger.

The life support system 26 can include oxygen supplies and/or air supplies in the form of pressurized gas tanks. Thus, the life support system 26 can provide supplemental air and/or oxygen to passengers via the life support lines 114 and the life support modules 28 in the event of a loss of cabin air pressure. The aircraft 10 generally includes at least one life support module 28 per passenger seat. Each life support module 28 generally includes a life support mask configured to provide air and/or oxygen to a passenger via the passenger's mouth and/or nose.

In another example, the life support system 26 includes a control system implemented via software and/or hardware and configured to control the life support modules 28. In this example, the life support lines 114 take the form of electrical wiring configured to provide control signals from the life support system 26 to gas cartridges and/or masks that are included as part of the life support modules 28. For example, a gas cartridge could be positioned adjacent to each life support mask of each life support module 28. In such examples, the life support system 26 can provide control signals, via the life support lines 114, to the life support modules 28 such that the life support modules 28 flow oxygen from their respective gas cartridges.

Figure 4:
FIG. 4 is a perspective view of a support box apparatus, according to an example.

FIG. 4 is a perspective view of the support box apparatus 100 with a forward end of the support box apparatus 100 in the left foreground and an aft end of the support box apparatus 100 in the right background. The support box apparatus 100 is configured for installation in the overhead area 52 of the cabin 54 of the aircraft 10 shown in FIG. 2.

The support box apparatus 100 includes the framework 102A. The framework 102A includes a longitudinal member 104A, a longitudinal member 104B, a longitudinal member 104C, and a longitudinal member 104D that span forward to aft. The longitudinal member 104A, the longitudinal member 104B, the longitudinal member 104C, and the longitudinal member 104D are all formed of composite honeycomb sandwich panels.

The framework 102A also includes a transverse member 106A, a transverse member 106B, a transverse member 106C, a transverse member 106D, a transverse member 106E, a transverse member 106F, a transverse member 106G, and a transverse member 106H that span inboard to outboard between the longitudinal member 104A, the longitudinal member 104B, the longitudinal member 104C, and the longitudinal member 104D. More specifically, the transverse member 106A and the transverse member 106E span between the longitudinal member 104A and the longitudinal member 104D. The transverse member 106B, the transverse member 106C, and the transverse member 106D span between the longitudinal member 104A and the longitudinal member 104B. The transverse member 106F, the transverse member 106G, and the transverse member 106H span between the longitudinal member 104B and the longitudinal member 104D. The transverse member 106A, the transverse member 106B, the transverse member 106C, the transverse member 106D, the transverse member 106E, the transverse member 106F, the transverse member 106G, and the transverse member 106H are all formed of composite honeycomb sandwich panels.

A composite honeycomb sandwich panel is a type of composite material structure that is manufactured by attaching two or more thin but stiff skins to a lightweight but thick core that has a unit cell having a honeycomb (e.g., hexagonal) structure. The core material is typically low strength material, but its high thickness provides the sandwich composite with high stiffness with low density. Sometimes, the honeycomb structure is filled with foams for added strength. The skin materials often take the form of sheet metal or laminates of glass or carbon fiber-reinforced thermoplastics or thermoset polymers. The core can be bonded to the skins with an adhesive, resin, or glue.

The framework 102A also includes the attachment components 108 configured to couple the longitudinal member 104A and the longitudinal member 104B to structural components 56 of the aircraft 10 that span inboard to outboard above the longitudinal members 104 and the transverse members 106. The attachment components 108 and the structural components 56 are discussed in more detail below.

The support box apparatus 100 also includes the electrical wiring 110 attached to the longitudinal members 104 and/or the transverse members 106. For example, electrical wiring 110A is attached to the longitudinal member 104D and the longitudinal member 104C. The forward end of the electrical wiring 110A can be connected to the electrical system 18, as an example. The electrical wiring 110A provides an electrical connection 111A for an electrical component (e.g., in the form of a male-to-female connection), an electrical connection 111B for an electrical component, an electrical connection 111C for an electrical component, and an electrical connection 111D for an electrical component. As such, the electrical wiring 110A spans across multiple transverse members 106E-H of the support box apparatus 100.

As shown, the support box apparatus 100 includes a light source 136A and a light source 136B (e.g., electrically operated lamps) that are powered via the electrical wiring 110A. For example, the light source 136A can be powered via the electrical connection 111B and the light source 136B can be powered via the electrical connection 111C. As shown, the light source 136A and the light source 136B are attached to the longitudinal member 104C.

The electrical wiring 110B is attached to the transverse member 106A. The electrical wiring 110B provides an electrical connection 111E between the electrical wiring 110B and the electrical system 18, for example via an electrical socket that is embedded within one of the structural components 56 of the aircraft 10 (discussed below). The electrical wiring 110B also provides an electrical connection 111F between the electrical wiring 110B (e.g., the electrical system 18) and another downstream electrical component. For example, the electrical wiring 110B could provide the electrical connection 111F for additional electrical wiring or electrical components that are attached to another framework 102.

The support box apparatus 100 also includes the environmental control system (ECS) ducting 112 attached to the longitudinal members 104 or the transverse members 106. The ECS ducting 112 is configured to provide fluid connections 113 between the ECS 22 of the aircraft 10 and ECS vents 24 of the aircraft 10. For example, ECS ducting 112A is attached to the transverse member 106E, the transverse member 106D, and the transverse member 106C. The ECS ducting 112A (e.g., via a dogleg turn) provides a fluid connection 113A between an ECS vent 24 (not shown) located in a passenger area and the ECS 22. ECS ducting 112B is attached to the transverse member 106E, the transverse member 106D, the transverse member 106C, and the transverse member 106B. The ECS ducting 112B provides a fluid connection 113B between an ECS vent 24 (not shown) located in a passenger area and the ECS 22. As such, the ECS ducting 112A and the ECS ducting 112B span across multiple transverse members of the support box apparatus 100.

The support box apparatus 100 also includes the life support lines 114 attached to the longitudinal members 104 or the transverse members 106. The life support lines 114 are configured to provide fluid connections 115 or electrical connections between the life support system 26 of the aircraft 10 and the life support modules 28 of the aircraft 10. For example, the life support lines 114A provides a fluid connection 115A between the life support lines 114A and additional life support lines (not shown) that runs through or alongside one or more structural components 56 of the aircraft 10 upstream to the life support system 26. The life support lines 114A also provides a fluid connection 115B between the life support lines 114A and a life support module 28 (not shown) located in a passenger area of the cabin. The life support lines 114B also provides a fluid connection 115C between the life support lines 114B and additional life support lines (not shown) that runs through or alongside one or more structural components 56 of the aircraft 10 upstream to the life support system 26. The life support lines 114B also provides a fluid connection 115D between the life support lines 114B and a life support module 28 (not shown) located in a passenger area of the cabin. More specifically, the life support lines 114B spans from an upper end 139 of the transverse member 106A to a lower end 141 of the transverse member 106A.

Figure 5:
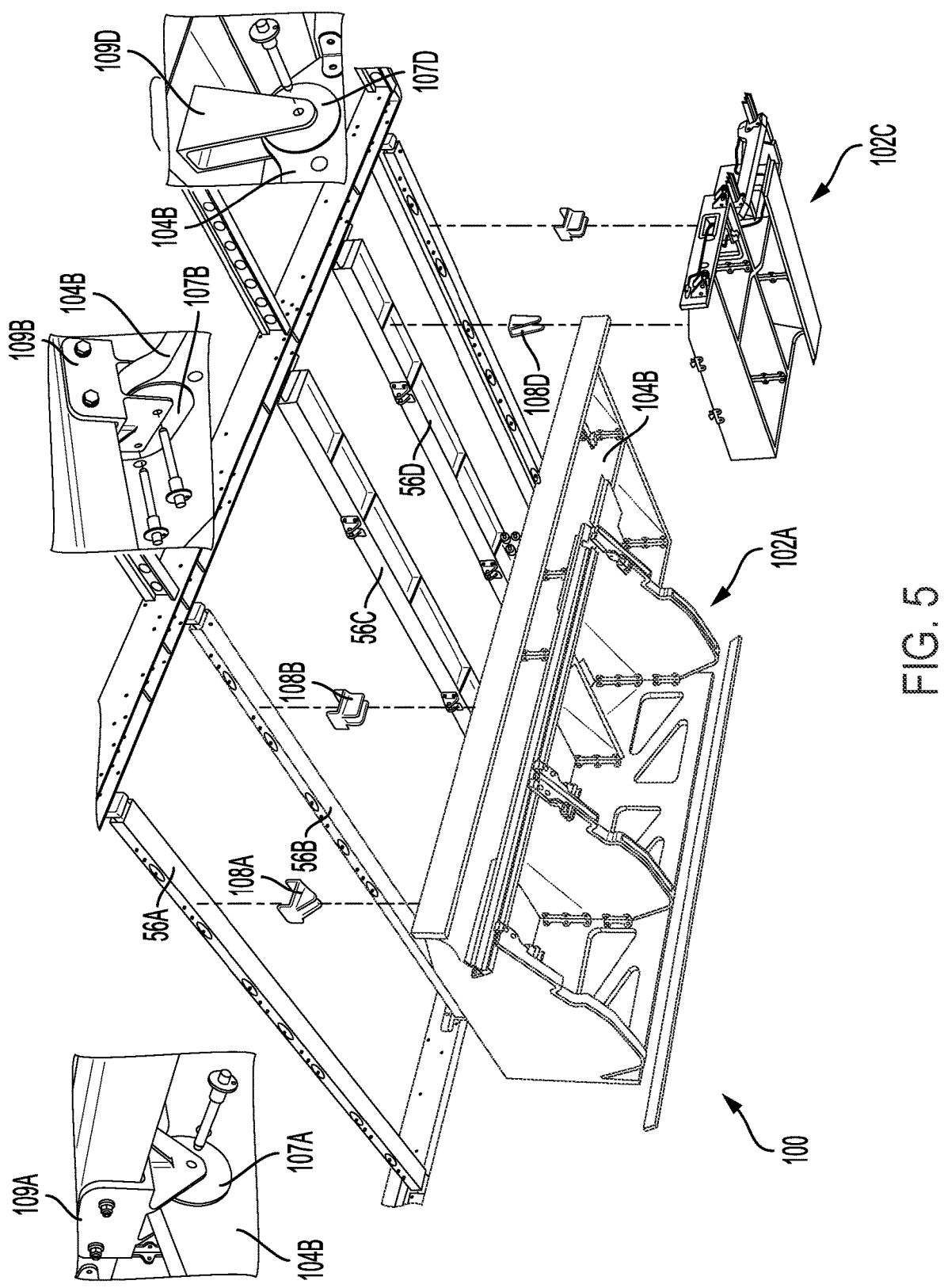
FIG. 5 is a partially exploded view of a support box apparatus, according to an example.

FIG. 5 is a partially exploded view of the support box apparatus 100. In FIG. 5, the support box apparatus 100 includes the framework 102A as well as the framework 102C that is installed aft of the framework 102A.

As shown, the attachment component 108A can couple the structural component 56A to the longitudinal member 104B. More specifically, the attachment component 108A includes a first unit 109A that is bolted to the structural component 56A and a second unit 107A that is secured to the longitudinal member 104B. A pin that is tethered to either the first unit 109A or the longitudinal member 104B is inserted through a hole in the second unit 107A and the longitudinal member 104B to attach the longitudinal member 104B to the structural component 56A.

Likewise, the attachment component 108B can couple the structural component 56B to the longitudinal member 104B. More specifically, the attachment component 108B includes a first unit 109B that is bolted to the structural component 56B and a second unit 107B that is secured to the longitudinal member 104B. Two pins that are tethered to either the first unit 109B or the longitudinal member 104B are inserted through holes in the second unit 107B and the longitudinal member 104B to attach the longitudinal member 104B to the structural component 56B.

The attachment component 108D can couple the structural component 56D to the longitudinal member 104B. More specifically, the attachment component 108D includes a first unit 109D that is bolted to the structural component 56D and a second unit 107D that is secured to the longitudinal member 104B. A pin that is tethered to either the first unit 109D or the longitudinal member 104B are inserted through a hole in the second unit 107D and the longitudinal member 104B to attach the longitudinal member 104B to the structural component 56D.

Figure 6:
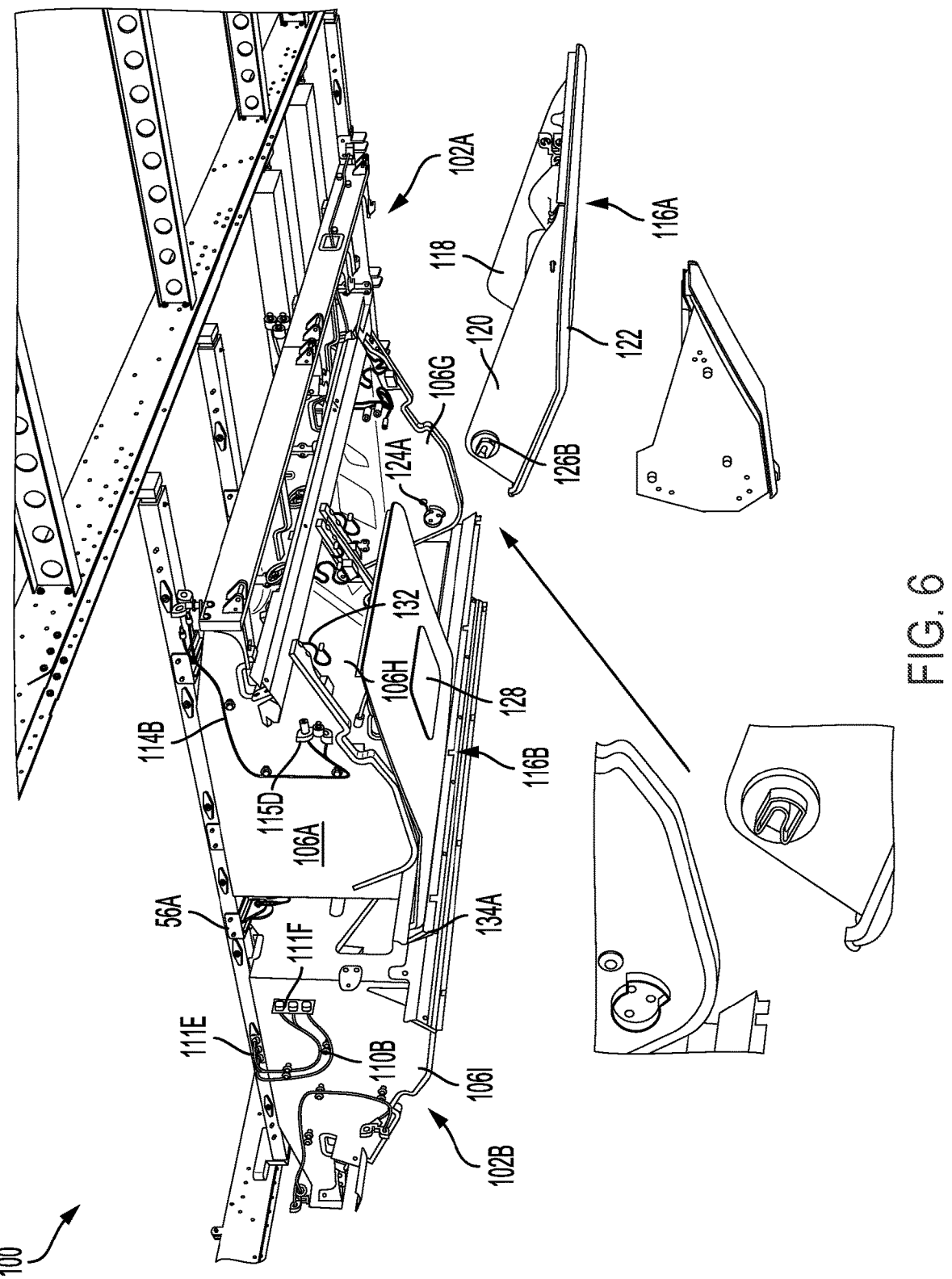
FIG. 6 is a partially exploded view of a support box apparatus, according to an example.

FIG. 6 is a partially exploded view of the support box apparatus 100, including the framework 102A and the framework 102B. The framework 102B is discussed in more detail below.

The support box apparatus 100 includes a ceiling panel 116A that further includes a first cross member 118 formed of a composite honeycomb sandwich panel that spans inboard to outboard at an aft end of the ceiling panel 116A. The ceiling panel 116A also includes a second cross member 120 formed of a composite honeycomb sandwich panel that spans inboard to outboard at a forward end of the ceiling panel 116A. The ceiling panel 116A also includes a lower member 122 that spans between the first cross member 118 and the second cross member 120.

The support box apparatus 100 also includes a receiver 124A attached to the transverse member 106G and a receiver (not shown) attached to the transverse member 106H facing the receiver 124A. The support box apparatus 100 also includes an insert (not shown) attached to the first cross member 118 facing away from an insert 126B that is attached to the second cross member 120. The receivers are configured to accept the inserts when the inserts have a first rotational orientation with respect to the receivers and are configured to capture the inserts when the inserts are within the receivers and have a second rotational orientation with respect to the receivers, the second rotational orientation being different from the first rotational orientation. As such, the receivers and inserts act to selectively attach the ceiling panel 116A to the framework 102A or release the ceiling panel 116A from the framework 102A.

FIG. 6 also shows another ceiling panel 116B. The ceiling panel 116B includes an access panel 128 that is configured to provide access to the life support system 26 (e.g., a life support mask). The life support lines 114B are configured to provide the fluid connection 115D or an electrical connection to the life support system 26 (e.g., a life support mask and/or a gas cartridge) that is above and adjacent to the access panel 128.

As shown, the ceiling panel 116B is positioned under the framework 102A and a tether 132 is configured to attach the ceiling panel 116B to an outboard end of the framework 102A.

In FIG. 6, the electrical wiring 110B is attached to a transverse member 106I of the framework 102B. The electrical wiring 110B provides the electrical connection 111E between the electrical wiring 110B and the electrical system 18, for example via an electrical socket that is embedded within the structural component 56A.

As shown in FIG. 4, the longitudinal member 104A can be referred to as an inboard longitudinal member because the longitudinal member 104B, the longitudinal member 104C and the longitudinal member 104D are outboard of the longitudinal member 104A. Referring back to FIG. 6, the support box apparatus 100 further includes an inboard rail 134A that spans forward to aft and is attached to the longitudinal member 104A. The ceiling panel 116B is positioned under the framework 102A. The ceiling panel 116B is configured to be captured between the inboard rail 134A and the transverse member 106A.

Figure 7:
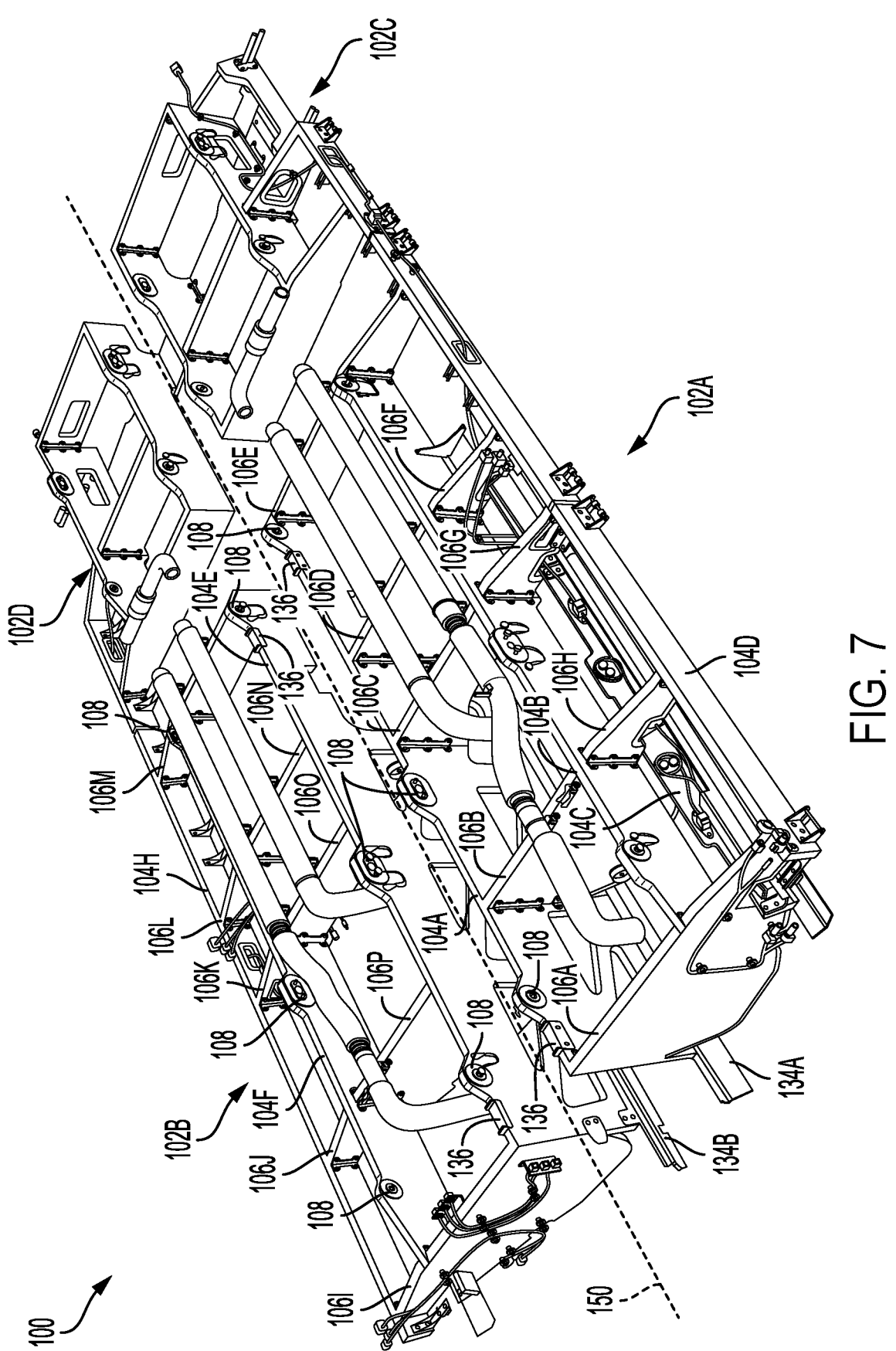
FIG. 7 is a perspective view of a support box apparatus, according to an example.

FIG. 7 is a perspective view of the support box apparatus 100, including the framework 102A, the framework 102B, the framework 102C, and the framework 102D.

The framework 102B includes a longitudinal member 104E, a longitudinal member 104F, a longitudinal member 104G (obscured in FIG. 7 but similar to and symmetric with the longitudinal member 104C across a centerline 150 of the aircraft 10), and a longitudinal member 104H that span forward to aft parallel to the longitudinal members 104A-D of the framework 102A. The longitudinal member 104E, the longitudinal member 104F, the longitudinal member 104G, and the longitudinal member 104H are all formed of composite honeycomb sandwich panels.

The framework 102B also includes a transverse member 106I, a transverse member 106J, a transverse member 106K, a transverse member 106L, a transverse member 106M, a transverse member 106N, a transverse member 106O, and a transverse member 106P that span inboard to outboard between the longitudinal members 104E-G. More specifically, the transverse member 106I and the transverse member 106M span between the longitudinal member 104E and the longitudinal member 104H. The transverse member 106J, the transverse member 106K, and the transverse member 106L span between the longitudinal member 104F and the longitudinal member 104H. The transverse member 106P, the transverse member 106O, and the transverse member 106N span between the longitudinal member 104E and the longitudinal member 104F.

The transverse members 106I-P are all formed of composite honeycomb sandwich panels and are substantially coplanar with the transverse members 106A-H. That is, the transverse member 106J, the transverse member 106P, the transverse member 106B, and the transverse member 106H are substantially coplanar. The transverse member 106K, the transverse member 106O, the transverse member 106C, and the transverse member 106G are substantially coplanar. The transverse member 106L, the transverse member 106N, the transverse member 106D, and the transverse member 106F are substantially coplanar. The transverse member 106I and the transverse member 106A are substantially coplanar. The transverse member 106M and the transverse member 106E are substantially coplanar.

The framework 102B also includes attachment components 108 configured to couple the longitudinal member 104E and the longitudinal member 104F to the structural components 56 of the aircraft 10 in a manner similar to the attachment components 108 described above with reference to the framework 102A.

The support box apparatus 100 also includes an inboard rail 134B that spans forward to aft and is attached to the longitudinal member 104E. The longitudinal member 104E can also be referred to as an inboard longitudinal member because it is inboard of the longitudinal members 104F-H. As shown, the inboard rail 134A and the inboard rail 134B have symmetry across the centerline 150 of the aircraft 10.

The support box apparatus 100 also includes brackets 136 attached to the longitudinal member 104A and covering a portion of an upper surface of the longitudinal member 104A. The support box apparatus 100 also includes brackets 136 attached to the longitudinal member 104E and covering a portion of an upper surface of the longitudinal member 104E. The brackets 136 are generally hardened plastic or metal and are configured to distribute a load across the upper surface of the longitudinal member 104A or the longitudinal member 104E. The brackets 136 are discussed in more detail below.

Figure 8:
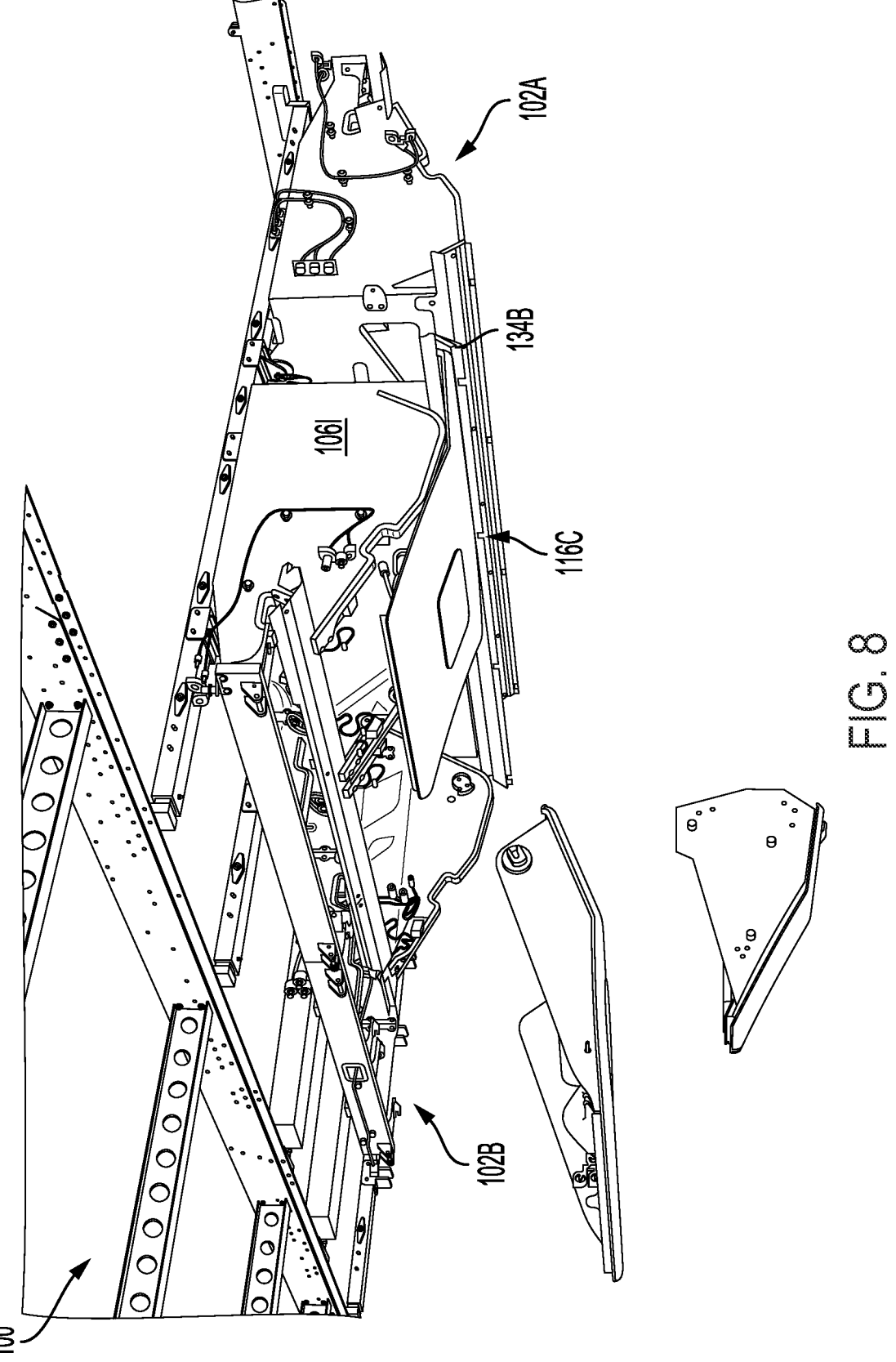
FIG. 8 is a partially exploded view of a support box apparatus, according to an example.

FIG. 8 is a partially exploded view of the support box apparatus 100, including the framework 102A and the framework 102B. As shown, the support box apparatus 100 also includes a ceiling panel 116C positioned under the framework 102B. The ceiling panel 116C is configured to be captured between the inboard rail 134B and the transverse member 106I. The ceiling panel 116C can include any or all of the structural features of the ceiling panel 116A or the ceiling panel 116B.

Figure 9:
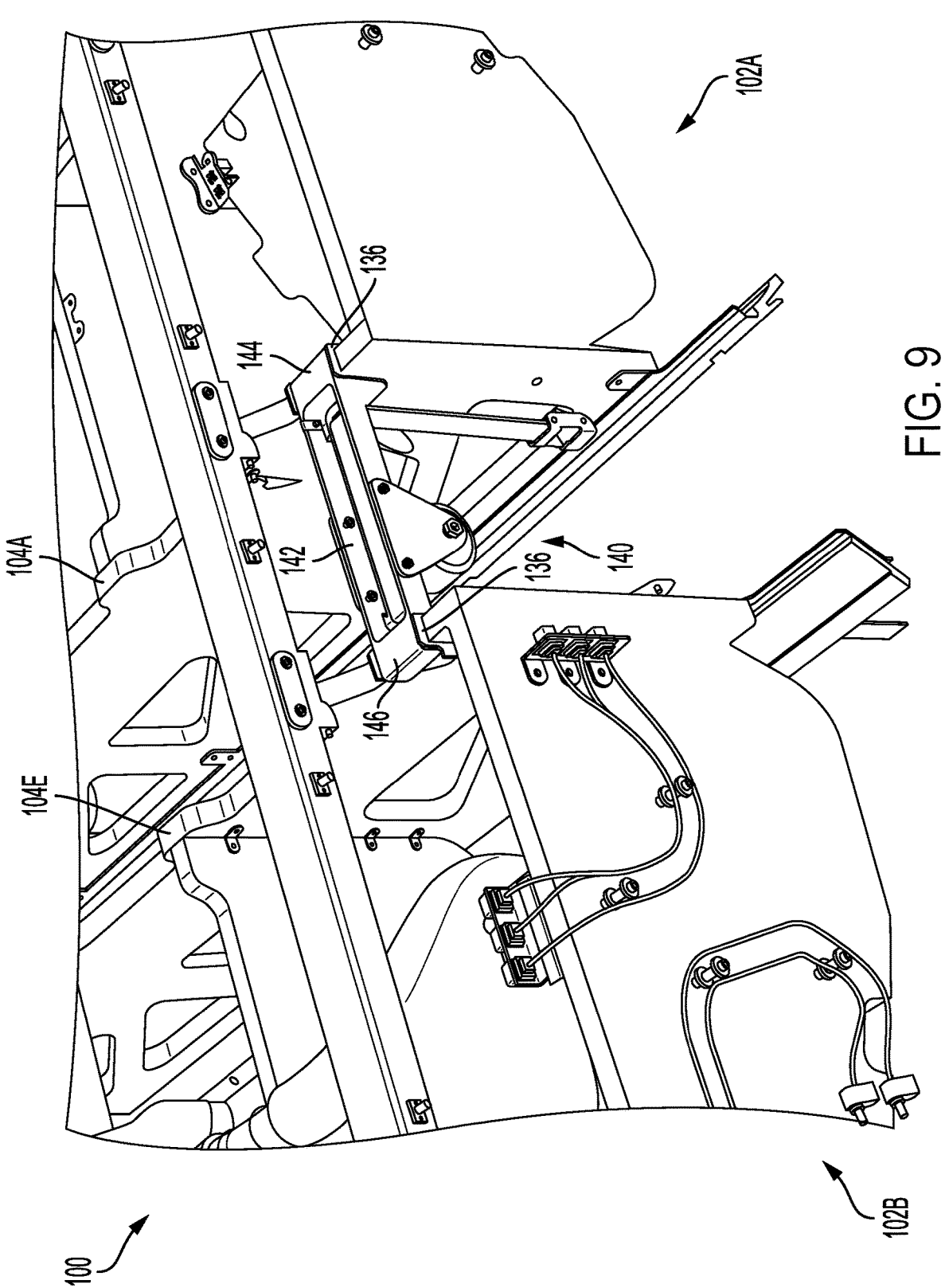
FIG. 9 is a close up view of a support box apparatus, according to an example.

FIG. 9 is a close up view of the support box apparatus 100. The support box apparatus 100 further includes a tooling system 140 (e.g., a pulley) that includes a base 142 having a first end 144 resting on a bracket 136 on the longitudinal member 104A and a second end 146 resting on a bracket 136 on the longitudinal member 104E. The tooling system 140 can be useful for raising, lowering, or stowing tools that are used for interior installation tasks or for raising, lowering, or stowing components that are to be installed in the cabin 54.

FIG. 10 and FIG. 11 are block diagrams of a method 200 and a method 250 for installing the support box apparatus 100 in the overhead area 52 of the cabin 54 of the aircraft 10. As shown in FIG. 10 and FIG. 11, the method 200 and the method 250 include one or more operations, functions, or actions as illustrated by blocks 202, 204, 206, 208, 210, 212, 214, 216, 218, and 220. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 202, the method 200 includes using a computer numerical control process to fabricate the longitudinal members 104 formed of composite honeycomb sandwich panels and the transverse members 106 formed of composite honeycomb sandwich panels. More specifically, a computer-operated machine tool is programmed and operated to cut stock composite honeycomb sandwich panels into the specific shapes and dimensions of the longitudinal members 104 and the transverse members 106, as shown in FIGS. 4-9.

At block 204, the method 200 includes assembling the support box apparatus 100, the support box apparatus 100 including the longitudinal members 104, the transverse members 106 spanning between the longitudinal members 104, the attachment components 108 coupled to the longitudinal members 104 or the transverse members 106, the electrical wiring 110 attached to the longitudinal members 104 or the transverse members 106, the environmental control system (ECS) ducting 112 attached to the longitudinal members 104 or the transverse members 106, and the life support lines 114 attached to the longitudinal members 104 or the transverse members 106, as shown in FIGS. 4-9.

Referring to FIG. 4, the longitudinal members 104 are attached to the transverse members 106 via angle brackets 171. For example, an angle bracket 171 is secured via fasteners to the longitudinal member 104A and the transverse member 106B. Other joints between longitudinal members 104 and transverse members 106 are formed in a similar fashion using angle brackets 171. Likewise, the attachment components 108 are fastened or otherwise attached to the longitudinal members 104.

In addition to angle brackets 171, other methods of joining members are also possible, for example bonded joints and/or tab-and-slot joints. These can be used for additional strength, ease of assembly, or in areas where fastener access for angle brackets would be difficult.

The electrical wiring 110, the ECS ducting 112, and the life support lines 114 are attached to the longitudinal members 104 or the transverse members 106 using brackets, fasteners, or other attachment components.

At block 206, the method 200 includes moving the support box apparatus 100 into the cabin 54 of the aircraft 10 after assembling the support box apparatus 100. For example, a crew of two persons could manually carry or use a lift or cart to carry the support box apparatus 100 into the cabin 54 via a door. Increasing the assembly activity that is performed off the aircraft 10 generally increases overall efficiency and ergonomics of the interior build process.

At block 208, the method 200 includes coupling the support box apparatus 100 to the structural components 56 of the aircraft 10 that span inboard to outboard within the overhead area 52 of the aircraft 10. Referring to FIG. 5, the support box apparatus 100 is manually or otherwise lifted into a position such that the attachment components 108 can secure the framework 102A to the structural components 56, as described above with reference to FIG. 5.

At block 210, the method 200 includes establishing, via the electrical wiring 110, electrical connections 111 between the electrical system 18 of the aircraft 10 and the electrical components 20 of the aircraft 10. Referring to FIGS. 4-8, the electrical wiring 110 is typically manually connected such that the electrical wiring 110 provides electrical connections 111 between the electrical system 18 of the aircraft 10 and the electrical components 20 of the aircraft 10.

At block 212, the method 200 includes establishing, via the ECS ducting 112, fluid connections 113 between the environmental control system (ECS) 22 of the aircraft 10 and the ECS vents 24 of the aircraft 10. Referring to FIGS. 4-8, the ECS ducting 112 is typically manually connected such that the ECS ducting 112 provides fluid connections 113 between the environmental control system (ECS) 22 of the aircraft 10 and the ECS vents 24 of the aircraft 10.

At block 214, the method 200 includes establishing, via the life support lines 114, the fluid connections 115 or electrical connections between the life support system 26 of the aircraft 10 and the life support modules 28 of the aircraft 10. Referring to FIGS. 4-8, the life support lines 114 are typically manually connected such that the life support lines 114 provides fluid connections 115 or electrical connections between the life support system 26 of the aircraft 10 and the life support modules 28 of the aircraft 10.

At block 216, the method 250 includes moving a ceiling panel inboard such that an insert attached to the ceiling panel is received by a receiver attached to a transverse member, such as the transverse member 106G. For example, the ceiling panel 116B is lifted and moved inboard such that an insert attached to a forward end of the ceiling panel 116B is received by the receiver 124. This functionality is described above with reference to FIG. 6.

At block 218, the method 250 includes rotating the ceiling panel (e.g., the ceiling panel 116A) such that the receiver captures the insert. For example, the ceiling panel 116A is rotated such that the receiver 124A captures the insert attached to the forward end of the ceiling panel 116A. This functionality is described above with reference to FIG. 6.

At block 220, the method 250 includes attaching a tether to a ceiling panel such that the ceiling panel is attached to the outboard end of the support box apparatus 100. For example, the tether 132 is attached to the ceiling panel 116B such that the ceiling panel 116B is attached to the outboard end of the support box apparatus 100. This functionality is described above with reference to FIG. 6.

The length of the tether 132 is designed to limit the ceiling panel 116B from inadvertently rotating and being released from the receiver 124A. This prevents the ceiling panel 116B from becoming decoupled from the receiver 124A (and possibly falling) unless the tether 132 is intentionally disconnected.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A support box apparatus for an overhead area of a cabin of an aircraft, the support box apparatus comprising:
   a framework comprising:
      longitudinal members that span forward to aft, wherein the longitudinal members are formed of composite honeycomb sandwich panels;
      transverse members that span inboard to outboard between the longitudinal members, wherein the transverse members are formed of composite honeycomb sandwich panels; and
      attachment components configured to couple the longitudinal members or the transverse members to structural components of the aircraft that span inboard to outboard above the longitudinal members and the transverse members;
   electrical wiring attached to the longitudinal members or the transverse members, wherein the electrical wiring is configured to provide electrical connections between an electrical system of the aircraft and electrical components of the aircraft;
   environmental control system (ECS) ducting attached to the longitudinal members or the transverse members, wherein the ECS ducting is configured to provide fluid connections between an environmental control system (ECS) of the aircraft and ECS vents of the aircraft;
   life support lines attached to the longitudinal members or the transverse members, wherein the life support lines are configured to provide fluid connections or electrical connections between a life support system of the aircraft and life support modules of the aircraft; and
   a tooling system comprising a base having a first end and a second end resting on one or more brackets on the longitudinal members, wherein the tooling system is configured to raise, lower, and stow one or both of tools used for interior installation tasks or components to be installed in the cabin.

2. The support box apparatus of claim 1, further comprising a ceiling panel comprising:

a first cross member formed of a composite honeycomb sandwich panel that spans inboard to outboard at a forward end of the ceiling panel;

a second cross member formed of a composite honeycomb sandwich panel that spans inboard to outboard at an aft end of the ceiling panel; and a lower member that spans between the first cross member and the second cross member.

3. The support box apparatus of claim 2, further comprising:

a receiver attached to a transverse member of the transverse members; and an insert attached to the first cross member or the second cross member, wherein the receiver is configured to accept the insert when the insert has a first rotational orientation with respect to the receiver and is configured to capture the insert when the insert is within the receiver and has a second rotational orientation with respect to the receiver, the second rotational orientation being different from the first rotational orientation.

4. The support box apparatus of claim 1, further comprising a ceiling panel comprising an access panel configured to provide access to the life support system, wherein the life support lines are configured to provide a fluid connection or an electrical connection to the life support system that is above and adjacent to the access panel.

5. The support box apparatus of claim 1, further comprising:

a ceiling panel positioned under the framework; and a tether configured to attach the ceiling panel to an outboard end of the framework.

6. The support box apparatus of claim 1, wherein the longitudinal members comprise an inboard longitudinal member and one or more additional longitudinal members that are outboard of the inboard longitudinal member, the support box apparatus further comprising:

an inboard rail that spans forward to aft and is attached to the inboard longitudinal member; and a ceiling panel positioned under the framework, wherein the ceiling panel is configured to be captured between the inboard rail and a transverse member of the transverse members.

7. The support box apparatus of claim 6, wherein the framework is a first framework, the longitudinal members are first longitudinal members, the inboard longitudinal member is a first inboard longitudinal member, the transverse members are first transverse members, the attachment components are first attachment components, the inboard rail is a first inboard rail, and the ceiling panel is a first ceiling panel, the support box apparatus further comprising:

a second framework comprising:

second longitudinal members that span forward to aft, wherein the second longitudinal members are formed of composite honeycomb sandwich panels, the second longitudinal members comprising a second inboard longitudinal member and one or more second additional longitudinal members that are outboard of the second inboard longitudinal member;

second transverse members that span inboard to outboard between the second longitudinal members, wherein the second transverse members are formed of composite honeycomb sandwich panels; and

second attachment components configured to couple the second longitudinal members to the structural components of the aircraft;

a second inboard rail that spans forward to aft and is attached to the second inboard longitudinal member; and a second ceiling panel positioned under the second framework, wherein the second ceiling panel is configured to be captured between the second inboard rail and a second transverse member of the second transverse members.

8. The support box apparatus of claim 7, wherein the second longitudinal members are substantially parallel with the first longitudinal members.

9. The support box apparatus of claim 7, wherein the second transverse members are substantially coplanar with the first transverse members.

10. The support box apparatus of claim 7, wherein the one or more brackets comprise:

a first bracket attached to the first inboard longitudinal member and covering a portion of an upper surface of the first inboard longitudinal member; and a second bracket attached to the second inboard longitudinal member and covering a portion of an upper surface of the second inboard longitudinal member, wherein the tooling system comprises a pulley, and wherein the first end rests on the first bracket and the second end rests on the second bracket.

11. The support box apparatus of claim 1, further comprising a light source configured to be powered by the electrical wiring, wherein the light source is attached to a longitudinal member of the longitudinal members.

12. The support box apparatus of claim 1, wherein the electrical wiring spans across multiple transverse members of the transverse members.

13. The support box apparatus of claim 1, wherein the ECS ducting spans across multiple transverse members of the transverse members.

14. The support box apparatus of claim 1, wherein the life support lines span from an upper end of a transverse member of the transverse members to a lower end of the transverse member.

15. An aircraft comprising:

structural components that span inboard to outboard;

a framework comprising:

longitudinal members below the structural components that span forward to aft, wherein the longitudinal members are formed of composite honeycomb sandwich panels;

transverse members below the structural components that span inboard to outboard between the longitudinal members, wherein the transverse members are formed of composite honeycomb sandwich panels; and attachment components that couple the longitudinal members or the transverse members to the structural components;

electrical wiring attached to the longitudinal members or the transverse members, wherein the electrical wiring provides electrical connections between an electrical system of the aircraft and electrical components of the aircraft;

environmental control system (ECS) ducting attached to the longitudinal members or the transverse members, wherein the ECS ducting provides fluid connections between an environmental control system (ECS) of the aircraft and ECS vents of the aircraft;

life support lines attached to the longitudinal members or the transverse members, wherein the life support lines provide fluid connections or electrical connections between a life support system of the aircraft and life support modules of the aircraft; and a tooling system comprising a base having a first end and a second end resting on one or more brackets on the longitudinal members, wherein the tooling system is configured to raise, lower, and stow one or both of tools used for interior installation tasks or components to be installed in the cabin.

16. The aircraft of claim 15, wherein the framework is a first framework, the longitudinal members are first longitudinal members, the longitudinal members comprise an inboard longitudinal member and one or more additional longitudinal members that are outboard of the inboard longitudinal member, the transverse members are first transverse members, and the attachment components are first attachment components, the aircraft further comprising:

a first inboard rail that spans forward to aft and is attached to the inboard longitudinal member;

a first ceiling panel positioned under the first framework, wherein the first ceiling panel is configured to be captured between the first inboard rail and a transverse member of the transverse members;

a second framework comprising:

second longitudinal members that span forward to aft, wherein the second longitudinal members are formed of composite honeycomb sandwich panels, the second longitudinal members comprising a second inboard longitudinal member and one or more second additional longitudinal members that are outboard of the second inboard longitudinal member;

second transverse members that span inboard to outboard between the second longitudinal members, wherein the second transverse members are formed of composite honeycomb sandwich panels; and second attachment components configured to couple the second longitudinal members to the structural components;

a second inboard rail that spans forward to aft and is attached to the second inboard longitudinal member, wherein the first inboard rail and the second inboard rail have symmetry across a centerline of the aircraft; and a second ceiling panel positioned under the second framework, wherein the second ceiling panel is configured to be captured between the second inboard rail and a second transverse member of the second transverse members.

17. The aircraft of claim 15, further comprising a light source configured to be powered by the electrical wiring, wherein the light source is attached to a longitudinal member of the longitudinal members.

18. The aircraft of claim 15, wherein the electrical wiring spans across multiple transverse members of the transverse members.

19. The aircraft of claim 15, wherein the ECS ducting spans across multiple transverse members of the transverse members.

20. The aircraft of claim 15, wherein the life support lines span from an upper end of a transverse member of the transverse members to a lower end of the transverse member.

* * * * *